(12) United States Patent
Robinson et al.

(10) Patent No.: US 9,998,461 B2
(45) Date of Patent: Jun. 12, 2018

(54) SERVER, A SYSTEM, A METHOD, A COMPUTER PROGRAM AND A COMPUTER PROGRAM PRODUCT FOR ACCESSING A SERVER IN A COMPUTER NETWORK

(75) Inventors: Julien Robinson, Chatenay-Malabry (FR); Johann Stan, Saint-Etienne (FR); Lionel Natarianni, Nogent-sur-Marne (FR)

(73) Assignee: Alcatel Lucent, Boulogne-Billancourt (FR)

( * ) Notice: Subject to any disclaimer, the term of this patent is extended or adjusted under 35 U.S.C. 154(b) by 33 days.

(21) Appl. No.: 14/115,399

(22) PCT Filed: Mar. 28, 2012

(86) PCT No.: PCT/EP2012/055447
§ 371 (c)(1),
(2), (4) Date: Nov. 4, 2013

(87) PCT Pub. No.: WO2012/150096
PCT Pub. Date: Nov. 8, 2012

(65) Prior Publication Data
US 2014/0082705 A1    Mar. 20, 2014

(30) Foreign Application Priority Data
May 4, 2011  (EP) .................................. 11305526

(51) Int. Cl.
*G06F 7/04*    (2006.01)
*H04L 29/06*   (2006.01)
(52) U.S. Cl.
CPC .......... *H04L 63/10* (2013.01); *H04L 63/0421* (2013.01); *H04L 63/08* (2013.01)

(58) Field of Classification Search
CPC ...... H04L 63/10; H04L 63/0421; H04L 63/08
See application file for complete search history.

(56) References Cited

U.S. PATENT DOCUMENTS 6,938,171 B1    8/2005  Isomichi et al.
8,606,643 B2 *  12/2013 Lawrence .............. G06Q 30/02
                                                        705/26.1

(Continued)

FOREIGN PATENT DOCUMENTS

CN      1599910 A     3/2005
GB    2 401 509 A    11/2004

(Continued)

OTHER PUBLICATIONS

International Search Report for PCT/EP2012/055447 dated Jul. 16, 2012.
"ArcSuite Web service interface reference guide", Fuji Xerox Co., Ltd., Mar. 31, 2008, First edition, pp. 120-121.

(Continued)

*Primary Examiner* — Techane Gergiso
(74) *Attorney, Agent, or Firm* — Fay Sharpe, LLP

(57) ABSTRACT

The invention concerns a first server (101) for accessing a second server (102) via a computer network (100), adapted to upon successful authentication of first credentials of a first user (EU) registered on said first server (101) by said first server (101), provide said first user (EU) access to at least a subset of functions provided by an interface (API) of said second server (102) using second credentials of a second user (HU) registered on said second server (102) for authentication with said second server (102).

15 Claims, 2 Drawing Sheets

(56) References Cited

U.S. PATENT DOCUMENTS

| | | | |
|---|---|---|---|
| 2003/0233329 A1 | 12/2003 | Laraki et al. | |
| 2005/0216300 A1* | 9/2005 | Appelman | G06Q 10/10 705/319 |
| 2006/0026434 A1 | 2/2006 | Yoshida et al. | |
| 2007/0234400 A1 | 10/2007 | Yanagi | |
| 2009/0080635 A1* | 3/2009 | Altberg | G06Q 30/02 379/216.01 |
| 2009/0172793 A1* | 7/2009 | Newstadt et al. | 726/6 |
| 2010/0306099 A1* | 12/2010 | Hirson | G06Q 20/10 705/38 |
| 2011/0231276 A1* | 9/2011 | Yeap | G06Q 30/06 705/26.3 |
| 2011/0238755 A1* | 9/2011 | Khan | G06Q 50/01 709/204 |
| 2012/0036181 A1* | 2/2012 | Isidore | G06Q 50/01 709/203 |
| 2013/0173712 A1* | 7/2013 | Monjas Llorente | G06Q 10/00 709/204 |

FOREIGN PATENT DOCUMENTS

| | | |
|---|---|---|
| JP | H11-053314 | 2/1999 |
| JP | 2000-003334 | 1/2000 |
| JP | 2000-172646 | 6/2000 |
| JP | 2004-302555 | 10/2004 |
| JP | 2005-321970 | 11/2005 |
| JP | 2006-035631 | 2/2006 |
| JP | 2007-257038 | 10/2007 |
| JP | 2008-225573 | 9/2008 |
| JP | 2011-060165 | 3/2011 |
| WO | WO 03/050743 A1 | 6/2003 |
| WO | WO 2007/054657 A2 | 5/2007 |
| WO | WO 2009/088638 | 7/2009 |

OTHER PUBLICATIONS

Japanese Office Action dated Nov. 13, 2014 with English translation.

* cited by examiner

SERVER, A SYSTEM, A METHOD, A COMPUTER PROGRAM AND A COMPUTER PROGRAM PRODUCT FOR ACCESSING A SERVER IN A COMPUTER NETWORK

FIELD OF THE INVENTION

The invention relates to a server, a system, a method, a computer program and a computer program product for accessing a server in a computer network.

BACKGROUND

Social networks are services, for example computer programs running on servers that allow users to share content, for example pictures, text, or audio/video. Typically, social networks only allow write access to the content to registered users. Access control is typically performed by said servers using credentials, for example username and password, in order to grant access to reading or writing of content in said social network.

Each user typically has its own user account on the social network, allowing to relate any content uploaded, using a specific account to the user that owns the account of the social network.

This means, that everyone who wants to participate in said social network needs to register first, for example to create an account on said server hosting said social network.

SUMMARY

The object of the invention is thus to allow users, that are not registered on a server of a social network, to access said social network without having to register first, while at the same time keeping the authentication requirement of the social network.

The main idea of the invention is thus to access from a first server the second server via a computer network, wherein said first server is adapted to upon successful authentication of first credentials of a first user registered on said first server by said first server, provide said first user access to at least a subset of functions provided by an interface of said second server, using second credentials of a second user registered on said second server for authentication with said second server, wherein said second server is adapted to provide said functions via said interface. This way, authentication of said first user on the first server is used to allow access to the social network via said second user's account on the social network without revealing to the social network the identity of the first user while at the same time enabling said social network to relate contributions of said first user to rejected user of said social network.

Advantageously, said first server comprises the receiving means adapted to receive a first message comprising information about said first user, in particular a request to access a function of said interface, from a first client, sending means adapted to send a second message comprising information about said second user in particular a request to access said function, to said second server, and processing means adapted to determine said information about said second user. This way, said first server receives information required to authenticate said first user, identifies said second user and the request of the first user, and sends information required for authentication on said second server to the second server.

Advantageously, said information about said second user is determined from said information about said first user. This way, each first user is mapped to the appropriate second user by said first server automatically.

Advantageously, said first message comprises a piece of information about said second user, and said information about said second user is determined from said piece of information. This way, said first user submits enough information in said first message to allow said first server to determine said second user automatically.

Advantageously, said information about said second user comprises credentials of said second user. This way the authentication message to said second server comprises all information required for said second server to authenticate said second user.

Advantageously, said information about said first user comprises credentials of said first user, wherein said first server comprises authentication means adapted to authenticate said first credentials of said first user and wherein said sending means is adapted to send said second message only upon successful authentication of said first credentials. This way, the request to access a function of a social network by a first user is only forwarded to said second server in case authentication of said first user on said first server is successful. This increases the reliability of the service.

Advantageously, said first message comprises a request to access a first function of said interface, wherein said processing means is adapted to confirm that said first user is authorized to request said first function, and wherein said sending means is adapted to send said second message only upon successful authorization. This allows a second user to define on said first server which of said functions provided by said interface are available to a first user. Furthermore, only requests to functions authorized by said second user are forwarded by said first server.

Further developments of the invention can be gathered from dependent claims and the following description.

BRIEF DESCRIPTION OF THE FIGURES

In the following, the invention will be explained further, making reference to the attached drawings.

DESCRIPTION OF THE EMBODIMENTS

Figure 1:
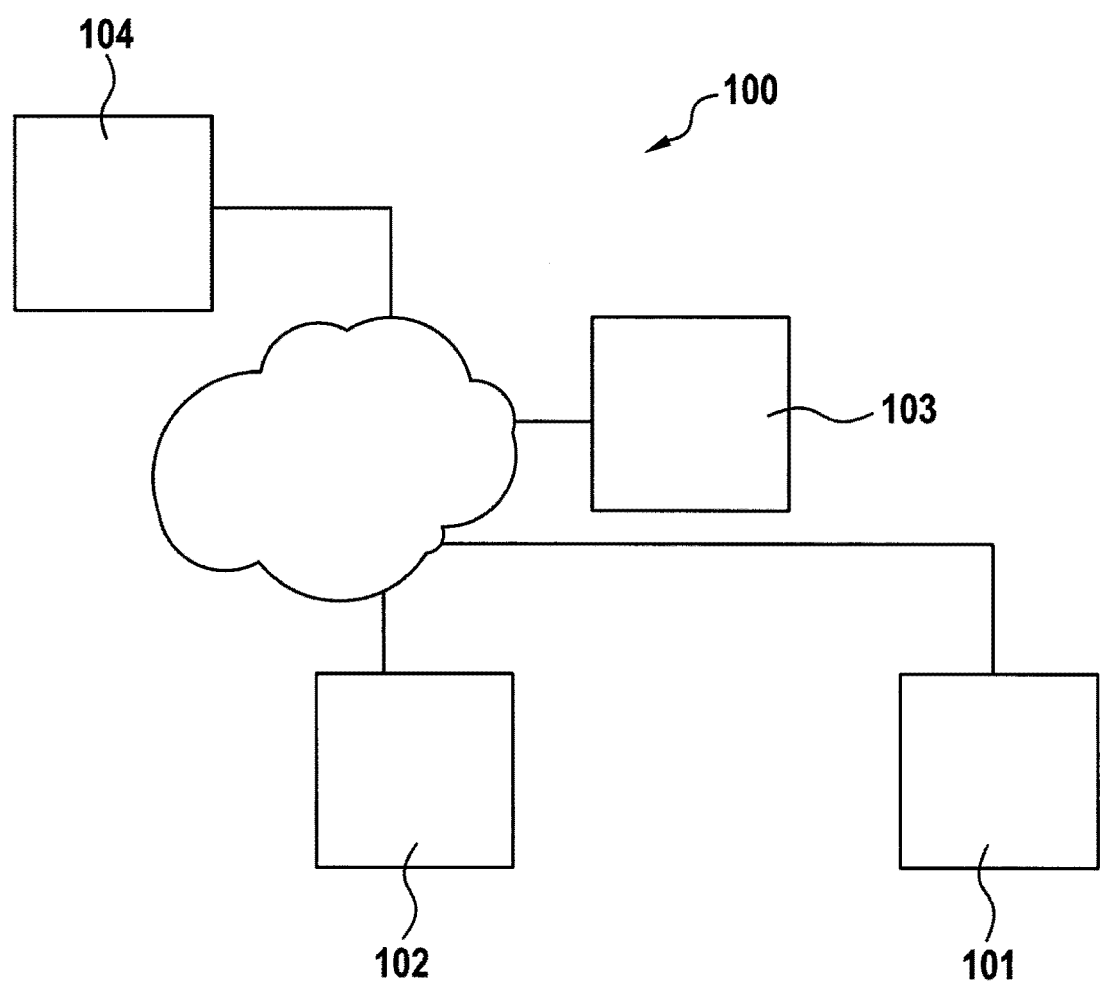
FIG. 1 schematically shows a first part of a computer network.

FIG. 1 shows schematically a part of a computer network 100, comprising a first server 101, a second server 102, a first client 103 and a second client 104.

Said servers and clients are connected via data links depicted as solid lines and a cloud in FIG. 1. Said data links are for example local area network (LAN), wireless local area network (WLAN) or wide area network (WAN) connections. Said connections are for example according to the well known internet protocol (IP), user datagram protocol (UDP), transmission control protocol (TCP) or stream control transmission protocol (SCTP), signaling is for example according to the well known simple object access protocol (SOAP), representational state transfer (REST), session initiation protocol (SIP) or internet protocol multimedia subsystem (IMS). Addressing may be done using the well known uniform resource locators (URL), uniform resource identifiers (URI), names or namespaces of extensible mark of language (XML version 1.0, third edition, W3C recommendation 8, December 2009).

The connections can but must not be directly between the servers or devices. Typical use is on wide area networks with multiple intermediate devices, depicted schematically as cloud in FIG. 1.

Said servers and clients comprise sending and receiving means adapted to send and receive messages, using the aforementioned protocols, addresses and data links.

Goal of the invention is to allow a first user EU, who is not registered user of a social network, to access said social network via the account of a second user HU, while at the same time marking all contributions of said first user EU to said social network with a requester identifier, allowing to relate the contribution of said first user to said first user without directly revealing said first user's identity to the social network.

Said second server 102 provides access to said social network via an interface API, for example an application programming interface.

Said second server 102 is adapted to authenticate second credentials of said second user HU, using said account of said second user HU. For example said second server 102 is adapted to authenticate said second user HU, using said second user's username and password as said second credentials.

Said second server 102 is adapted to provide functions of said social network via said interface API. Providing functions in this context means for example allowing read-access to read or download content of said social network, write-access to generate new content on said social network, including uploading of pictures or videos or audios.

Interfaces API, like the well known application programming interfaces are known to the person skilled in the art, as well as read-, write-, or upload-functions.

Said first server 101 comprises authentication means adapted to authenticate first credentials of said first user EU. Said first credentials are for example a first username and a first password, belonging to a first account of said first user, stored on said first server.

Said receiving means of said first server 101 is adapted to receive a first message 208, comprising information about said first user EU, in particular a request to access a function of said interface API. Said information about said first user EU is for example said first credentials.

Said sending means of said first server 101 is adapted to send a second message 212, comprising information about said second user HU, in particular a request to access said function. Said sending means of said first server 101 is for example adapted to send said second message 212 only upon successful authentication of said first credentials by said authentication means of said first server 101.

Said information about said second user HU is for example said second credentials.

Said first server 101 comprises processing means adapted to determine said information about said second user HU.

Said processing means is for example adapted to determine said information about said second user HU from said information about said first user EU. Alternatively or additionally, said first message 208 comprises a piece of information about said second user HU, and said information about said second user HU is determined from said piece of information. For example, said second username is said piece of information and said second credentials are determined by mapping said second username to said second credentials. To that end said second credentials may be stored on said first server 101, for example in a database.

Said first server 101 comprises optionally processing means adapted to determine if said first user EU is authorized to request said function. In this case, said sending means is adapted to send said second message 212 only upon successful authorization. For example a mapping of functions to first user names is stored on said first server 101 in said database and said processing means is adapted to determine allowed functions from said database.

Figure 2:
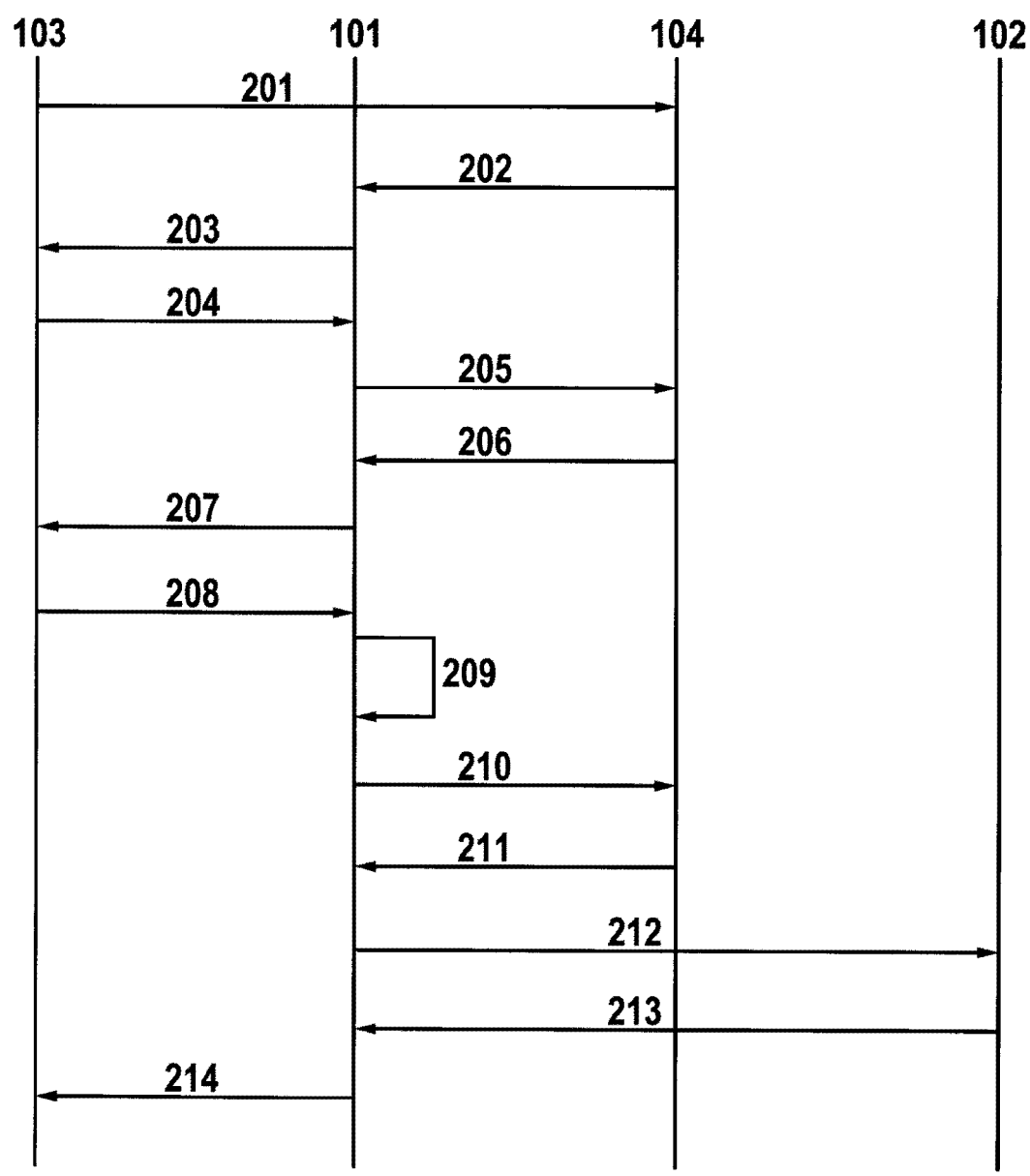
FIG. 2 schematically shows a sequence diagram.

A method for accessing from said first server 101 said second server 102 via said computer network 100 is explained below, making reference to the sequence diagram of FIG. 2.

According to said method, upon successful authentication of first credentials of said first user EU, registered on said first server 101, access to at least a subset of functions provided by said interface API of said second server 102 is provided to said first user EU, using said second credentials registered on said second server 102 for authentication of said second user HU.

Said method starts for example whenever said first user EU starts a client program on said first client 103, in order to access said social network. Said client program may be a web browser with a plug-in, allowing to access social networks.

After the start, a message 201, Request, is sent from said first client 103 to said second client 104. Said message 201 is for example a request to access said social network, comprising said first username, a target identifier for identifying said social network and the address of said first client 103. Said target identifier is for example an internet protocol address.

Upon receipt of said message 201, said second client 104 sends a message 202, Request to said first server 101. Said message 202 is for example a request for access point creation, comprising a list of allowed functions, said second user's credentials, said target identifier of said social network, said first username and said address of said first client 103. Said second user's credentials may be read by said second client 104 from storage automatically or said second client 104 may prompt said second user HU for confirmation, for example using a computer program running on said second client 104. Said computer program is for example a web browser with a plug-in, automatically prompting said second user HU for confirmation.

Upon receipt of said message 202, said first server 101 sends a message 203, Response, to said first client 103. Said message 203 is for example a response comprising the address of an access point created by said first server 101 for said first user EU. Said message 203 for example comprises said first credentials of said first user EU, that allow said first user EU to register or login to said first account of said first user EU on said first server 101. Said first credentials are for example a uniform resource identifier URI.

Upon receipt of said message 203, said first client 103 sends a message 204, Request, for example a request for activation of said access point. Said message 204 is optional. Said message 204 comprises for example said first credentials and said address of said first client 103. Said first credential may be for example part of said uniform resource identifier URI. Said message 204 may be sent upon receipt of a user-input, for example a mouse click on a link symbolizing said uniform resource identifier URI by said first client 103. To that end, said first client 103 may be adapted to upon receipt of said message 203, display said link, for example said uniform resource identifier URI on said web browser via said plug-in.

Upon receipt of said message 204, said first server sends an optional message 205, Request, to said second client 104.

Said message 205 is for example a request for activation confirmation, comprising said first username.

Upon receipt of said message 205, said second client 104 sends an optional message 206, Response, to said first server 101. Said message 206 is for example a response to the activation confirmation, comprising a text "ok". Said message 206 may be sent by said second client 104 only upon receipt of an input, confirming said activation. To that end, said second client 104 may be adapted to display a prompt for activation confirmation, including said first username and send said message 206 only in case the user of said second client 104 confirms said activation by clicking on a button displayed next to said prompt.

Upon receipt of said message 206, said first server 101 forwards said message 206 to said first client 103 as an optional message 207, Response.

Said message 207 is for example said activation confirmation text "ok".

Said messages 201 to 207 are required for account activation of said first account of said first user EU on said first server 101. However, said messages 204 to 207 are optional for account activation.

In case said first user EU already has a valid account on said first server 101, said first client 103 is adapted to omit said steps 201 to 207.

Upon receipt of said message 207, or in case a valid account for said first user EU already exists on said first server 101, immediately after the start of said method, said first client 103 sends a message 208, Request, to request access to a function to said first server 101. Said message 208 comprises a function identifier for identifying the requested function, said target identifier for identification of said social network, said first user credential, said first client's 103 address and optional payload data. Said function identifier is for example a text string "read", "write", "upload", "download". Said target identifier is for example an internet protocol address of said second server 102. Said first credentials is for example said uniform resource identifier URI. Said optional payload data is for example text or a picture or video that shall be sent to said social network.

Said first client 103 is adapted to send said message 208 upon receipt of input from said first user EU, for example via said web browser plug-in. Said plug-in for example prompts said first user EU to indicate said function identifier by entering said text string and identify said social network, for example from a list from available social networks and mapping said social network to said target identifier. Furthermore, said first client 103 is adapted to read said first credentials from storage on said first client 103, for example from a password-manager application. Furthermore, said first client 103 is adapted to prompt for optional payload, in case a function requiring payload was selected by said first client 103.

This means that said message 208 comprises information about said first user EU, in particular said request to access said function of said interface API. To that end, said first client 103 or said web browser plug-in is adapted to prompt said first user EU for functions only that are available in said social network, identified by said target identifier.

Upon receipt of said message 209, said first server 101 performs an authentication 109 of said first user. To that end, said first server 101 authenticates for example said first credentials using the account data of said first account stored on said first server 101. Optionally, said first server 101 may additionally perform an authorization check to determine whether the requested function is available to said first user EU. To that end, for example said first server 101 compares said function identifier, received in said message 208, to said list of allowed functions stored on said first server 101 and only authorizes said first user EU to request said function in case said function identifier is found in said list of authorized functions for said first user EU.

Additionally or optionally, said first server 101 is adapted to send a message 210, Request, to said second client 104. Said message 210 is for example a request for authorization of access to said functions that is sent to said second user HU. Said message 210 comprises for example said function identifier, said first username and said optional payload.

Upon receipt of said message 210, said second client 104 sends a message 211, Response, to said first server 101. Said message 211 may be an authorization result, for example a text "OK" or "not OK". Said message 211 may be sent only upon receipt of a confirmation from said second user HU. For example, said second client 104 is adapted to prompt said second user HU to authorize said access request by said first user EU to said function. To that end, for example said function identifier and said optional payload are displayed next to said first username. Said input of said second user HU may be a mouse click on a button displayed next to said prompt.

Upon successful authentication 209, or optionally upon receipt of a positive response in message 211, said first server 101 is adapted to send a message 212, Request, to said second server 102. Said message 212 is for example a request to access to a function via said interface API. Said message 212 for example comprises a function identifier, said second credentials, said optional payload and said requester identifier.

Said second credentials are for example read from storage of said first server 101. Said requester identifier is for example said first username. Said requester identifier may be a random number or a nickname. In case a nickname is used, said first server 101 is adapted to store said nickname with said account data of said first account of said first user EU. This way, said nickname may be related to said first user EU, for example in case of legal prosecution.

In case said nickname is used for example, said first server 101 is adapted to prompt in additional messages said first client 103 to provide said nickname, for example during account creation after said message 201. Alternatively, said message 201 may comprise said nickname already.

In case said random number is used, said random number is stored instead of said nickname.

Said message 212 in this case does not contain any information allowing said second server 102 or said social network to identify directly said first user EU. However, for legal prosecution, said requester identifier allows said social network provider to track content received in said message 212 or actions performed using said message 212 via said second credentials. This means, that said second credentials allow to relate all content viewed or received by said first user EU to be related to said first user EU via said second user HU.

Upon receipt of said message 212, said second server 102 performs the requested action that is for example executes the requested function using said function identifier, said optional payload and said requester identifier. Typically, said second server 102 performs said function only in case said second credentials are successfully authenticated against said second user HU account.

Upon completion of said function, said second server 102 sends a message 213, Response, to said first server 101. Said message 213 comprises said requester identifier and payload. For example, said nickname is in said message 213 and the result of said function is in said payload.

Upon receipt of said message 213, said first server 101 sends a message 214, Response, to said first client 103. For example said first server 101 determines from said requester identifier via lookup in said storage said first client's address and then sends said message 214 to said first client 103. Said message 214 for example comprises said payload. Said first cluster address is in this case stored upon authentication.

Optionally or alternatively, instead of using said requester identifier, for example said nickname, to identify the address of said first client 103, any other means of relating the response message 213 to the request message 212 may be used by said first server 101. For example, said response message 213 may be related to said request message 212 via identifiers used by said interface API.

A syntax of said requester identifier may be defined as a text string in which, additionally to said first user's nickname, said second user's name in said social network is used. To that end, said first server 101 may be adapted to determine said requester identifier from said first username and said second username. This way, not only the provider of the social network, but also all users able to view the content, are able to relate said first user's nickname to said second user's name in said social network. This may make relating said first user EU to said content via said second user HU easier, for example in case of legal prosecution.

The functionality of said interface API of said second server 102 may provide for different parameters or options to be sent in said message 212. Also, the response message 213 may be structurally or from its content be different from said message 213 describes above. It is understood that the invention applies likewise to any type of interfaces API that are provided by said second server 102. Particularly, interfaces like the simple object access protocol (SOAP), the representational state transfer (REST) or any other protocol used for accessing functions of social networks may be used. A computer program stored on a computer program product may resemble the method.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A first server for accessing a second server providing functions of a social network via a computer network, the first server comprising:
    at least one processor adapted to, upon successful authentication of first credentials of a first user registered on said first server by said first server, provide said first user access to at least a subset of functions of said social network provided by an interface of said second server via an account of said second user by using second credentials of a second user registered with said social network on said second server for authentication with said second server, wherein the first user is an unregistered user of said social network on said second server;
    a receiver adapted to receive a first message comprising a request to access a first function of said interface, and to confirm that said first user is authorized to request said first function; and
    a transmitter adapted to send a second message only upon successful authorization.

2. The first server according to claim 1, wherein said receiver is adapted to receive said first message comprising information about said first user, in particular a request to access a function of said interface, from a first client, said transmitter is adapted to send said second message comprising information about said second user, in particular a request to access said function, to said second server, and said at least one processor is adapted to determine said information about said second user.

3. The first server according to claim 2, wherein said information about said second user is determined from said information about said first user.

4. The first server according to claim 2, wherein said first message comprises a piece of information about said second user and said information about said second user is determined from said piece of information.

5. The first server according to claim 2, wherein said information about said second user comprises credentials of said second user.

6. The first server according to claim 2, wherein said information about said first user comprises credentials of said first user, wherein said first server comprises an authenticator adapted to authenticate said first credentials of said first user and wherein said transmitter is adapted to send said second message only upon successful authentication of said first credentials.

7. The first server according to claim 2, wherein said first message comprises a request to access a first function of said interface, wherein said at least one processor is adapted to confirm that said first user is authorized to request said first function, and wherein said transmitter is adapted to send said second message only upon successful authorization.

8. A method for accessing from a first server a second server providing functions of a social network via a computer network, said method comprising:
upon successful authentication of first credentials of a first user registered on said first server by said first server, access to at least a subset of functions of said social network provided by an interface of said second server is provided to said first user via an account of said second user by using second credentials of a second user registered with said social network on said second server for authentication with said second server, wherein the first user is an unregistered user of said social network on said second server, wherein a first message comprising a request to access a first function of said interface is received by said first server, an authorization check to confirm that said first user is authorized to request said first function is performed by said first server, and a second message is sent by said first server only upon successful authorization.

9. The method according to claim 8, further comprising receiving said first message comprising information about said first user, in particular a request to access a function of said interface, from a first client, sending said second message comprising information about said second user, in particular a request to access said function, to said second server, and processing to determine said information about said second user.

10. A system comprising:
a first server comprising a first processor and adapted to, upon successful authentication of first credentials of a first user registered on said first server by said first server, provide said first user access to at least a subset of functions of a social network provided by an interface of a second server via an account of a second user by using second credentials of said second user registered with said social network on said second server for authentication with said second server, wherein the first user is an unregistered user of said social network on said second server;
said second server comprising a second processor and adapted to provide said subset of functions via said interface, wherein said first server is adapted to receive a first message comprising a request to access a first function of said interface, to confirm that said first user is authorized to request said first function, and send a second message only upon successful authorization.

11. The system according to claim 10, further comprising a first client comprising a third processor, adapted to send a first message comprising information about said first user, in particular a request to access a function of said interface.

12. The system according to claim 10, wherein said first server comprises a receiver adapted to receive said first message comprising information about said first user, in particular a request to access a function of said interface, from said first client, a transmitter adapted to send said second message comprising information about said second user, in particular a request to access said function, to said second server, and said first processor is adapted to determine said information about said second user.

13. The system according to claim 12, further comprising a second client, comprising a receiver adapted to receive a third message comprising information about said first user, in particular a request to access said first function of said interface, from said first server, a transmitter adapted to send a fourth message comprising information about an authorization of said first user to use said first function and a third processor, adapted to determine said information about said authorization, wherein said receiver of said first server is adapted to receive said fourth message wherein said transmitter of said first server is adapted to send said third message to said second client and to send said second message only upon successful authorization by said second client.

14. A non-transitory computer-usable data carrier storing instructions that, when executed by a computer, cause the computer to:
upon successful authentication of first credentials of a first user registered on said first server by said first server, provide said first user access to at least a subset of functions of a social network provided by an interface of a second server via an account of said second user by using second credentials of a second user registered with said social network on said second server for authentication with said second server, wherein the first user is an unregistered user of said social network on said second server, wherein a first message comprising a request to access a first function of said interface is received by said first server, an authorization check to confirm that said first user is authorized to request said first function is performed by said first server, and a second message is sent by said first server only upon successful authorization.

15. A non-transitory computer-usable data carrier storing instructions that, when executed by a computer, cause the computer to:
upon successful authentication of first credentials of a first user registered on said first server by said first server, provide said first user access to at least a subset of functions of a social network provided by an interface of a second server via an account of said second user by using second credentials of a second user registered with said social network on said second server for authentication with said second server, wherein the first user is an unregistered user of said social network on said second server, wherein a first message comprising a request to access a first function of said interface is received by said first server, an authorization check to confirm that said first user is authorized to request said first function is performed by said first server, and a second message is sent by said first server only upon successful authorization;
provide said subset of functions via said interface, wherein said first server is adapted to receive a first message comprising a request to access a first function of said interface, to confirm that said first user is authorized to request said first function, and send a second message only upon successful authorization.

* * * * *